United States Patent [19]

Coyne et al.

[11] Patent Number: 4,522,598

[45] Date of Patent: Jun. 11, 1985

[54] EDUCATIONAL TOY MAILBOX

[76] Inventors: Daniel P. Coyne; Alberta P. Coyne, both of P.O. Box 258, Anderson, Calif. 96007

[21] Appl. No.: 612,064

[22] Filed: May 18, 1984

[51] Int. Cl.³ .............................................. G09B 19/00
[52] U.S. Cl. ..................................................... 434/259
[58] Field of Search ....................... 434/259, 178, 195; 446/491

[56] References Cited

U.S. PATENT DOCUMENTS

| | | | |
|---|---|---|---|
| 1,307,649 | 6/1919 | Wiel | 232/24 |
| 2,623,303 | 12/1952 | Mindel | 434/259 |
| 2,911,740 | 11/1959 | Miller | 434/259 |
| 3,099,389 | 7/1963 | Vadnai | 232/24 |
| 3,414,986 | 12/1968 | Stassen | 434/195 |
| 3,787,987 | 1/1974 | Brass | 434/178 |
| 4,162,581 | 7/1979 | O'Connor | 434/259 |
| 4,427,389 | 1/1984 | D'Andrade | 434/259 X |

FOREIGN PATENT DOCUMENTS 1109819  4/1968  United Kingdom ................ 434/259

Primary Examiner—William H. Grieb
Attorney, Agent, or Firm—Leonard D. Schappert

[57] ABSTRACT

An educational toy for use in developing manual dexterity and color recognition and distinction and in teaching children to recognize and distinguish larger from smaller numbers and to understand their relationships to physical size and to one another.

3 Claims, 8 Drawing Figures

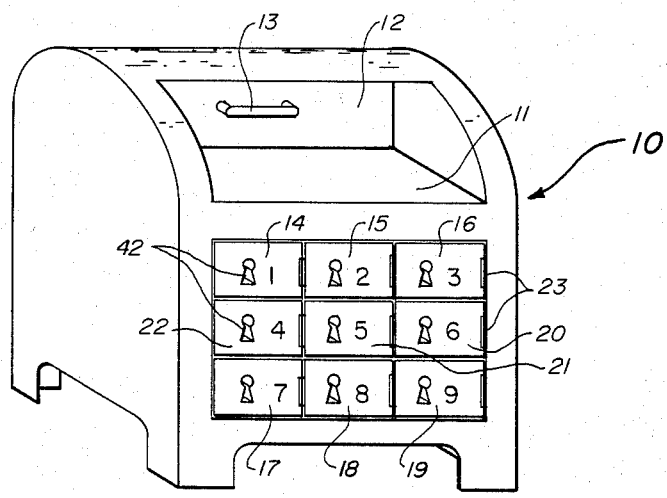
FIG. 1
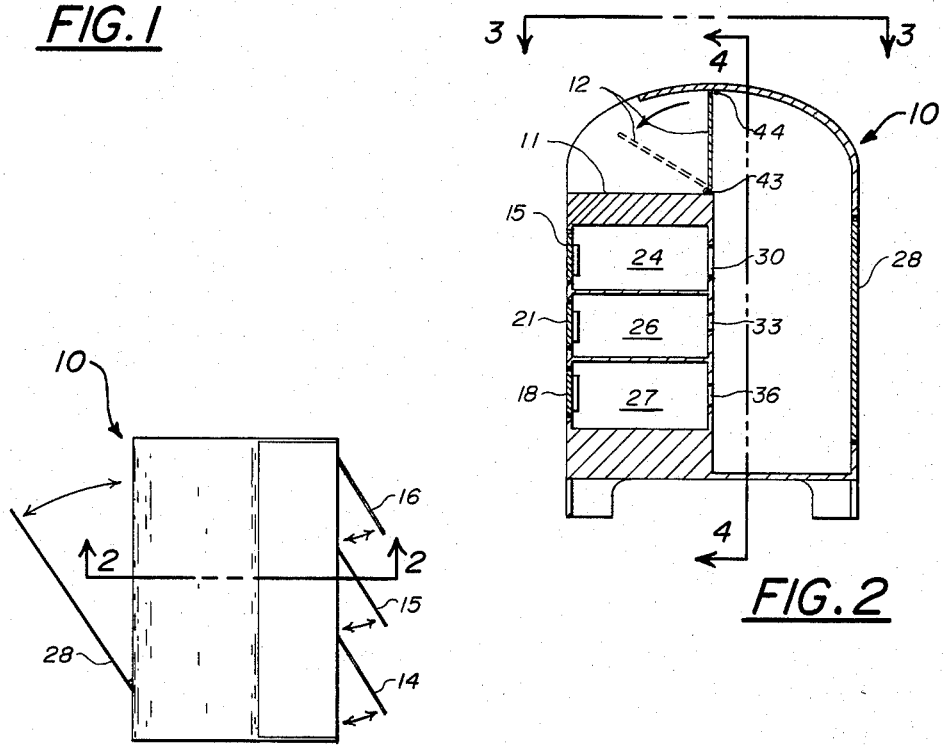
FIG. 2
FIG. 3

EDUCATIONAL TOY MAILBOX

BACKGROUND OF THE INVENTION

1. Field of the Invention

This invention relates generally to educational toys, and more specifically to toys used in teaching young children to recognize and distinguish larger from smaller numbers and to understand their relationships to physical size and to each other, as well as developing manual dexterity and the ability to distinguish color.

2. Description of the Prior Art

In the past, inventors have directed their creative efforts toward combination mailboxes designed in such a way that multiple postal customers could insert mail, but including individual boxes in the same structure designed for delivery of mail to the postal customers. Other inventors have designed toy post office boxes having multiple drawers and equipment which tended to teach a child to a certain degree how a postal system might operate. Other inventors have directed their attention to educational devices with variously shaped blocks to improve the child's manual dexterity and to teach the child to distinguish between shapes. Applicant is unaware of any prior art which combines the unique features taught in the present invention for the development of the child's manual dexterity in combination with the development of an intimate understanding of numbers and their relationships to each other and to physical size.

SUMMARY OF THE INVENTION

The present invention comprises an educational toy mailbox. The body of the present invention is constructed in the shape of a mailbox and includes several numbered postal box doors with drawers behind them. The postal box doors may be keyed or not keyed. On the back of the present invention is a large door. The aforementioned drawers are sealed at the back with peculiarly designed slots cut therein, the shapes of which are such that blocks cut to fit snugly into any one of the slots will not fit into any of the other slots.

One of the objects of the present invention is to provide an educational toy which helps to familiarize a child with the number system and to give the child an understanding of the relationships of numbers to each other.

Another object of the present invention is to reinforce the child's understanding of number relationships through the use of blocks which are numbered and the relative size of each of which corresponds to the number imprinted on it.

A further object of the present invention is to provide an educational toy which improves a child's manual dexterity while at the same time giving the child an understanding of the number system and the relationships of numbers to each other and to physical size.

A further object of the present invention is to develop a child's color recognition in combination with the foregoing objects.

The foregoing objects, as well as other and further objects, are made more apparent in the description and claims which follow.

DESCRIPTION OF THE DRAWINGS

FIG. 1 is a perspective view taken along the front and side of the present invention.

FIG. 2 is a cross-sectional view of the invention taken along lines 2—2 of FIG. 3.

FIG. 3 is a top view of the invention taken along lines 3—3 of FIG. 2.

DESCRIPTION OF THE PREFERRED EMBODIMENT

Figure 4:
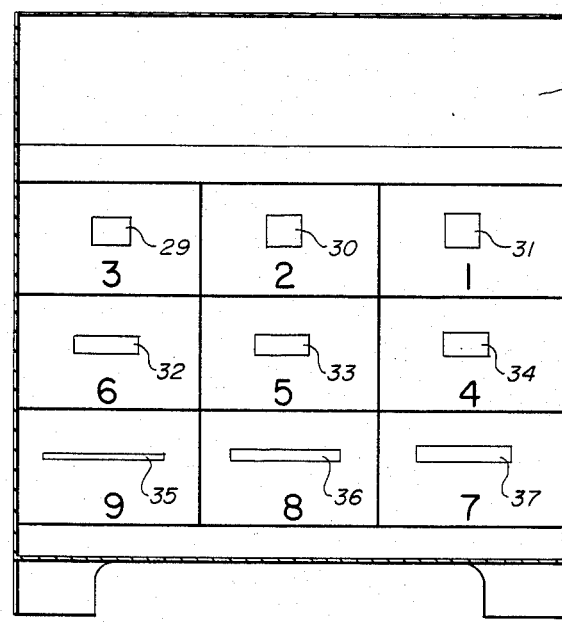
FIG. 4 is a cross-sectional view taken along lines 4—4 of FIG. 2.

FIG. 1 shows a perspective view of the mailbox 10. Mailbox 10 provides a mail slot door 12 which may be pulled open to permit the deposit of simulated "mail" in the form of blocks similar to those shown as 38 and 39 in FIGS. 5 and 6 of the drawings. Doors 14, 15, 16, 17, 18, 19, 20, 21 and 22 are provided and have numbers 1 through 9 imprinted thereon as shown. These doors are hinged at hinges 23, and have means for locking and unlocking them in the form of keyholes 42 and locks. Behind the aforementioned doors are compartments in which blocks 38 and 39 may be placed. The position and layout of compartments 24, 26 and 27, which sit behind doors 15, 21 and 18, is shown in FIG. 2 of the drawings. Although not specifically shown, substantially identical compartments are positioned behind the remaining doors.

FIG. 2 is a cross-sectional view of mailbox 10 taken along lines 2—2 of FIG. 3 of the drawings. A large door 28 is located at the rear of mailbox 10 and gives access to the rear side of compartments 24, 26 and 27 and the other compartments. Wall 11 is provided to simulate the appearance of a postal mailbox. Mail slot door 12 is hinged to wall 11 by hinge 43, and swings to an open or closed position as shown by the arrow in FIG. 2. A stop 44 is positioned at the top of mailbox 10 to prevent mail slot door 12 from swinging over into the rear part of mailbox 10.

FIG. 3 of the drawings is a top view of mailbox 10 showing door 28 and individual doors 14, 15 and 16 in an open condition.

FIG. 4 is a rear view of the inside of mailbox 10 taken along lines 4—4 of FIG. 2. The back surfaces of compartments 24, 26 and 27, as well as those of the other compartments, are numbered consecutively 1 through 9, these numbers corresponding with the numbering on the doors at the front of mailbox 10. Slots 29, 30, 31, 32, 33, 34, 35, 36 and 37 are all of different sizes, so that a block designed to fit one of the slots will fit only that slot and no other. This is accomplished with successive lengthening and narrowing of the slots.

Figure 5:
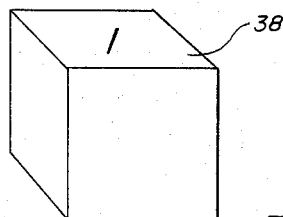
FIGS. 5 and 6 show blocks of different sizes designed to be inserted into the slots shown in FIG. 4.
Figure 6:
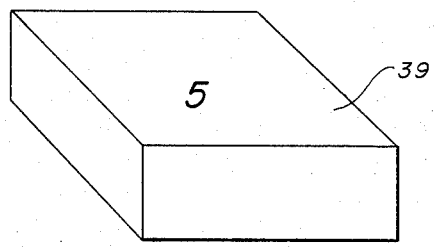

FIGS. 5 and 6 of the drawings show blocks 38 and 39, numbered 1 and 5, which are specifically designed to fit into slots 1 and 5 on the back of mailbox 10.

Figure 7:
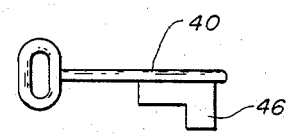
FIGS. 7 and 8 show keys to be utilized in opening the drawers shown in FIG. 1.
Figure 8:
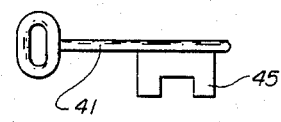

FIGS. 7 and 8 show key handles 40 and 41 with keys 45 and 46 attached. Keys having different shapes are provided to fit each of the locks, designated generally 42 in FIG. 1, and are such that each key will unlock one door only and no other.

While the description set forth above shows the physical construction of mailbox 10, further specifications include the use of different colors to represent mailbox doors 1, 2, 3, 4, 5, 6, 7, 8 and 9. The areas designated by numbers 1 through 9 on the back of mailbox 10 are colored correspondingly with the doors on the front of mailbox 10. Blocks 38 and 39, as well as the other blocks used with slots 29, 30, 31, 32, 33, 34, 35, 36 and 37, are colored to correspond to the color of the door on the front of the box which they fit. The keys shown in FIGS. 7 and 8 are also colorcoordinated so that a key which fits door 14 is colored to match door 14, and so on.

Because of the coordination of color-coded slots on the back of mailbox 10 with blocks representing "mail" which are size- and color-coordinated to match the areas surrounding the slots on the back of mailbox 10, as well as the color-coordination of the doors in the front of mailbox 10 with the keys used to open them, an unconscious learning process takes place in a child's mind, not only teaching the child to recognize and match colors, but also developing the child's manual dexterity through the use of keys, in addition to the child's understanding of the relationships of numbers to each other and to physical size.

The foregoing has illustrated and described the preferred embodiment of the present invention at this time. However, because improvements and changes will become readily apparent to those skilled in the art of making learning devices, it is to be understood that it is applicant's intent not to be limited by any of the foregoing descriptions, but only by the claims which follow.

I claim:

1. An educational toy for developing understanding of the relationship of larger and smaller numbers to physical size and to one another, comprising:

a body having individual numbered compartments therein, each said individual numbered compartment having an access door bearing a number assigned to said individual numbered compartment and a deposit hole identified with said number assigned to said individual numbered compartment with which it communicates, each said deposit hole being of an unique shape and size so that an object of correct shape and size fits into one said deposit hole but not into any other said deposit hole, the size of each said deposit hole corresponding to said number assigned to said individual numbered compartment with which it communicates so that said deposit holes associated with successively lower-numbered said individual numbered compartments are successively smaller, while said deposit holes associated with successively higher-numbered said individual numbered compartments are successively larger, and a set of deposit objects, each having a number and an unique shape and size corresponding to said number and said unique shape and size of one of said deposit holes so that each said deposit object fits into only one said deposit hole identified with a matching number, thereby developing children's understanding of the relationship of larger and smaller numbers to physical size and to one another.

2. The invention of claim 1 wherein said individual numbered compartments are color-coded with a color to distinguish them from one another, and said access door, said deposit hole and said deposit object associated with each said individual numbered compartment are color-coded with said color assigned to said individual numbered compartment with which they are associated, thereby increasing the effectiveness of teaching children the relationship of larger and smaller numbers to physical size and to one another.

3. The invention of claim 2 wherein each said access door has a lock, and including individual keys keyed to each individual said access door and each bearing said number of said access door which it is keyed to open.

* * * * *